(12) United States Patent
Brown

(10) Patent No.: US 6,323,584 B1
(45) Date of Patent: *Nov. 27, 2001

(54) INTERCHANGEABLE VESSEL HAVING A LEVEL SENSOR THEREWITH

(75) Inventor: Richard Hunter Brown, Chesham (GB)

(73) Assignee: Measurement Specialties Inc., Fairfield, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/704,030

(22) Filed: Aug. 26, 1996

(30) Foreign Application Priority Data

Sep. 6, 1995 (GB) .................................... 9518151

(51) Int. Cl.[7] .................................... H01L 41/08
(52) U.S. Cl. .......................... 310/334; 310/337; 310/800
(58) Field of Search .................. 310/334–337, 310/338, 339, 800

(56) References Cited

U.S. PATENT DOCUMENTS

| 3,113,761 | * | 12/1963 | Platzman | 310/334 X |
|---|---|---|---|---|
| 3,191,913 | * | 6/1965 | Mettler | 310/334 X |
| 3,371,233 | * | 2/1968 | Cook | 310/334 |
| 3,441,754 | * | 4/1969 | Heny | 310/334 X |
| 4,063,457 | | 12/1977 | Zekulin et al. | 73/290 V |
| 4,217,781 | * | 8/1980 | Abts | 310/334 X |
| 4,459,850 | * | 7/1984 | Hyanova et al. | 310/334 X |
| 4,469,976 | * | 9/1984 | Scott | 310/334 |
| 4,482,834 | * | 11/1984 | Dias et al. | 310/336 X |
| 4,565,942 | * | 1/1986 | Sakai et al. | 310/338 |
| 4,656,384 | * | 4/1987 | Mugori | 310/334 |
| 5,351,036 | * | 9/1994 | Brown et al. | 340/618 |
| 5,669,262 | * | 9/1997 | Lichtenfels et al. | 73/290 V |
| 5,911,158 | * | 6/1999 | Henderson et al. | 310/336 X |
| 5,969,621 | * | 10/1999 | Getman et al. | 310/334 X |

FOREIGN PATENT DOCUMENTS

| 39 12783 A1 | 10/1990 | (DE) | G01F/23/28 |
|---|---|---|---|
| 90 10 566.4 | 10/1990 | (DE) | G01F/23/28 |
| 0 515 254 A1 | 11/1992 | (EP) | G01F/23/28 |
| 0091293 | * 7/1980 | (JP) | 310/334 |
| WO 82/04122 | 11/1982 | (WO) | G01F/23/28 |
| WO 93/02340 | 2/1993 | (WO) | G01F/23/28 |

OTHER PUBLICATIONS

"A Two–Wire Ultrasonic Level Meter With Piezoelectric Polymer–Film Sensor"; ISA/88 Proceedings Houston, TX (1988).

* cited by examiner

Primary Examiner—Mark O. Budd
(74) Attorney, Agent, or Firm—Duane Morris LLP

(57) ABSTRACT

An interchangeable vessel having a substance therein where the vessel is constructed to be inserted into a larger apparatus so that the apparatus may use the substance therein, the interchangeable vessel comprising a tank formed of acoustically conductive material and a piezo electric film element affixed to the outer surface of the vessel where the piezo electric film element includes electrical contacts interconnected to an active signal electrode and a ground electrode that are formed as part of the piezo electric film level sensor where the contact pads are constructed to be electrically coupled with electronics contained within the apparatus for driving the piezo electric element.

5 Claims, 1 Drawing Sheet

INTERCHANGEABLE VESSEL HAVING A LEVEL SENSOR THEREWITH

BACKGROUND OF THE INVENTION

1. Field of the Invention

This invention relates to vessels for holding a liquid therein that are interchangeable within a larger apparatus and where the liquid level therein must be monitored.

2. Description of the Prior Art

There are many modern apparatus that utilize liquid contained within an interchangeable vessel in their function. One example would be a modern computer printer. These devices typically include a disposable ink cartridge that contains the ink used to perform the printing operation. It is advantageous if it could be determined when the level of these cartridges is getting low. With typical black ink, the ink contains sufficient carbon that it is known to use an electrical current to determine whether or not a certain level of fluid remains within a cartridge. A problem has arisen with respect to the new colour printers in that the coloured ink used therein does not have sufficient carbon to provide an adequate electrical signal path. Mechanical apparatus is also known to measure liquid level and typically involves a float coupled to a mechanical switch or potentiometer connected thereto. A problem with these devices is that they must be in physical contact with the fluid within the cartridge and therefore take up space therein. In addition, mechanical structure such as this would be relatively expensive even in the high qualities that are envisioned for interchangeable cartridges such as these. It would be difficult for a user to recycle the mechanical apparatus due to the associated mess involved in interchanging the devices between the old and replacement cartridges. It is also known to use ultrasonic measuring of liquid levels by measuring the time required for an acoustic signal to travel across a portion of the cartridge where the ink would be disposed. As such systems have their moving parts, they have good reliability; however, most are relatively complex and expensive which is a major drawback when dealing with a vessel that must interchangeable and may in fact be disposable.

It is further known by way of U.K. Patent Application No. 9513267.6 entitled "Liquid Level Switch" to incorporate the benefits of acoustic liquid level measuring without some of the associated problems. In this application a sensor that is fixable upon an outer surface of a tank wall is disclosed. The operating concept involves sending an acoustic pulse through the tank wall and detecting the characteristics of a reflection that would be caused by the tank wall air interface versus the tank wall liquid interface. Therefore, it is desired to incorporate this technology into an interchangeable vessel that would be easy to use and economical in form.

SUMMARY OF THE INVENTION

These and other objects are accomplished by providing an interchangeable vessel for receiving a substance therein where the vessel is constructed to be inserted into a larger apparatus so that the apparatus may use the substance therein, the interchangeable vessel comprising a tank formed of acoustically conductive material and a piezo electric film element affixed to the outer surface of the vessel; where the piezo electric film element includes electrical contacts interconnected to an active signal electrode and a ground electrode that are formed as part of the piezo electric film level sensor; where contact pads of the electrodes are constructed to be electrically coupled with electronics contained within the apparatus for driving the piezo electric element.

Advantageously, an interchangeable vessel is provided with a sensing element that is economical and easy to use. It is a further advantage of this invention that the device may be made disposable.

DETAILED DESCRIPTION OF THE PREFERRED EMBODIMENT

Figure 1:
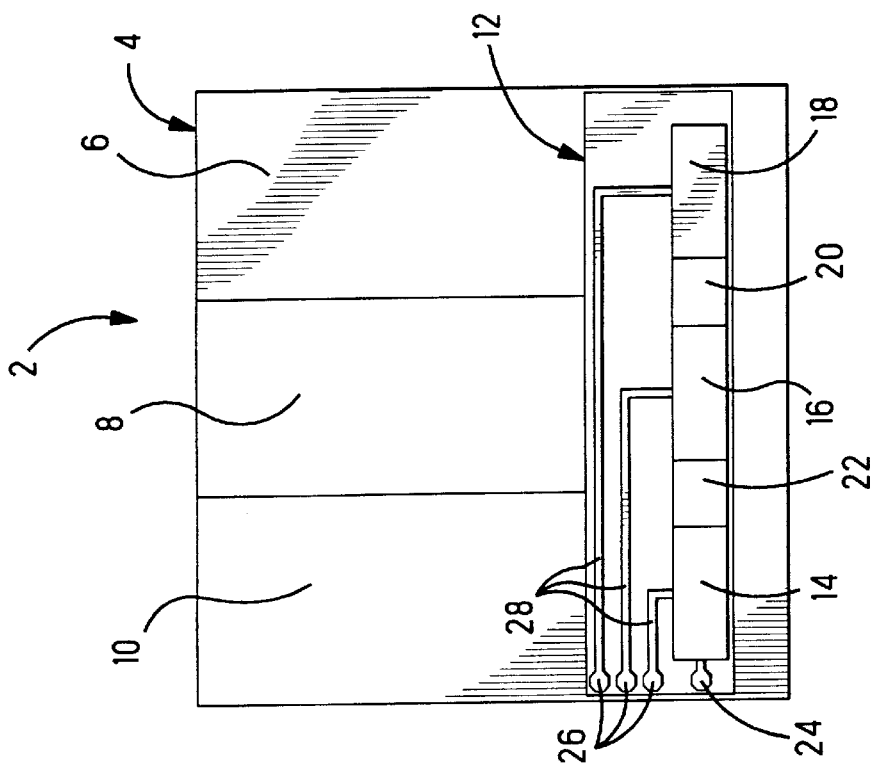
FIG. 1 is a side view of an interchangeable vessel incorporating a level sensor thereupon according to the present invention.

With reference now to FIG. 1, a vessel according to the present invention is shown generally at 2. This vessel 2 includes a tank portion 4 having three reservoirs 6,8,10 therein, each for holding a substance therein. In this embodiment, the tank 4 is generally rectangular in shape. It should be noted that the tank could take on any desired shape and may include multiple reservoirs as shown in FIG. 1, or only a single reservoir. Disposed across the tank 4, towards the bottom thereof, is a piezo electric film element 12.

The piezo electric film element 12 includes a metalized portion that is made up of three active signal electrodes 14,16,18 that are respectively separated by ground planes 20,22. The ground function of this apparatus is electrically coupled through to a ground contact pad 24. Furthermore, each of the active signal electrodes 14,16,18 are connected to signal contact pads 26 that are interconnected by way of circuit traces 28.

Figure 2:
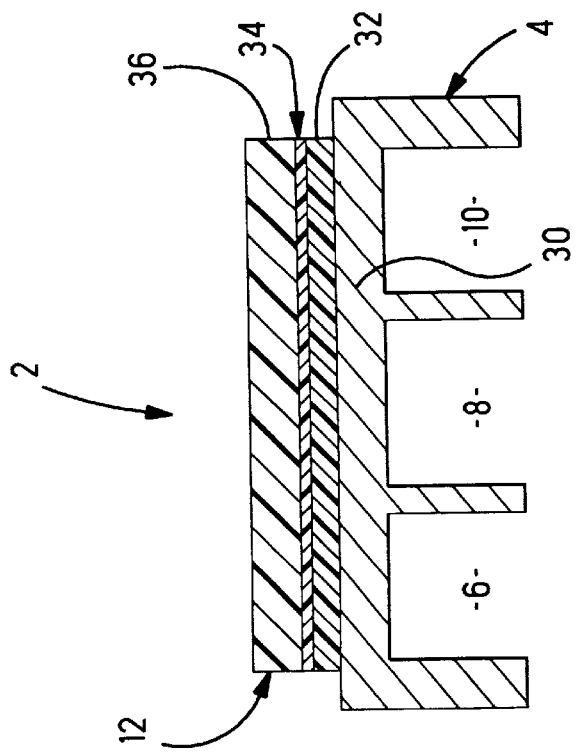
FIG. 2 is a cross sectional view of a portion of vessel of FIG. 1.

With reference now to FIG. 2, a cross-section of the vessel 2 is shown. The tank 4 is shown having an outer wall 30 upon which the piezo electric element 12 is affixed. The piezo electric element 12 is bonded thereto by an acoustically transparent adhesive 32. The actual piezo film 34 is metallized, and is laminated between the adhesive 32 and possibly a polyester laminant 36. The polyester laminant 36 would obviously be formed in such a way that the signal contacts 26 and the ground contact 24 are accessible therefrom as all the electrical contacts would be desirably made along the outer surface. The inter-connection with the driving circuitry within the main apparatus (not shown) could occur by way of spring metal contacts. The interchangeable vessel 2 is inserted into the apparatus to form a wiping interconnection with the spring metal contacts or the insulating/conductive rubber alternating structure that is typically used to connect LCD displays.

The aforegoing is simply an example and other desirable connections may be realized. In the simplest form, the device is intended to measure when the last few millimeters of ink are remaining and then convert this into a user friendly form, such as a visual display. The driving circuitry is well known and explained in the afore-mentioned patent that is being incorporated by reference. The circuitry can run on a single five volt supply and draws only a few milliamps when running. If it is further desired to minimize the current draw, the measurement may be made at specific intervals as opposed to continuously.

It would also be possible to manufacture the piezo-electric sensor element 12 in a continuous manner so that high speed and high volume manufacture may be realized. This would involve fabricating the structure on a continuous basis and possibly supply the product on long rolls similar to labelling systems. In addition, the outer polyester surface 36 could also act as a carrier so that typical label printing could be disposed thereupon. This would enable the entire assembly to look like a label disposed upon a tank. As it is also envisioned that the wiping interconnection would occur as the device is being seated within the apparatus, there is no need for additional actions in order to affect the electrical interconnections.

What is claimed is:

1. An interchangeable vessel for receiving a substance therein where the vessel is constructed to be inserted into a larger apparatus so that the apparatus may use the substance therein, the interchangeable vessel comprising a tank formed of acoustically conductive material and a single piezo electric film element affixed to an outer wall of the vessel the single piezo electric film element having a vertical extent against which the substance level is acoustically detected and where the single piezo electric film element includes electrical contacts interconnected to an active signal electrode for transmitting and receiving an acoustic signal via said single piezo electric film element and a ground electrode that are formed as part of the piezo electric film element where the contacts are constructed to be electrically coupled with electronics contained within the apparatus for driving the piezo electric film element.

2. The interchangeable vessel of claim 1 wherein the vessel includes multiple reservoirs and the piezo electric film element includes active signal electrodes at each of the reservoirs.

3. A substance level detecting apparatus, comprising the combination of a single piezo electric film element applied to a vertical extent of an acoustically conductive wall of a vessel, and acoustic signal transmitting means, wherein said vessel includes multiple reservoirs and wherein said single piezo electric film element spans said multiple reservoirs for detecting a substance level in each said reservoir, said piezo electric film element including a corresponding active signal electrode and a ground electrode associated with each said reservoir for electrical connection with the acoustic signal transmitting means.

4. The apparatus of claim 3, wherein the ground and signal electrodes have contact pads for electrical connection with the piezo electric film element.

5. The apparatus of claim 3, wherein the substance is a fluid.

* * * * *